United States Patent

[11] 3,578,008

[72] Inventor Robert O. Clark
 Albuquerque, N. Mex.
[21] Appl. No. 793,760
[22] Filed Jan. 24, 1969
[45] Patented May 11, 1971
[73] Assignee The United States of America as represented by the Secretary of the Air Force

[54] FAST OPENING PLATE VALVE SHOCK TUBE SYSTEM
1 Claim, 3 Drawing Figs.
[52] U.S. Cl. .................................................. 137/68,
 73/12, 102/25, 251/63
[51] Int. Cl. ..................................................... F16k 31/12,
 G01n 3/02
[50] Field of Search........................................... 137/68, 70,
 71, 492; 251/61.1, 63; 102/25; 73/12

[56] References Cited
UNITED STATES PATENTS
| 880,030 | 2/1908 | Leavitt | 137/68X |
| 3,102,553 | 9/1963 | Ottestad | 73/12X |
| 3,323,531 | 6/1967 | Spellman | 137/68 |

Primary Examiner—M. Cary Nelson
Assistant Examiner—Richard Gerard
Attorneys—Harry A. Herbert, Jr. and Arsen Tashjian ABSTRACT: A thin aluminum plate is positioned over one end of a shock tube to seal the passage between high and low pressure regions. Upon sudden reduction of the pressure on one side of the plate, a low pressure rarefaction passes toward the plate causing the plate to move rapidly away from the shock tube opening and allow high pressure gas to enter the tube and form a chock wave therein.

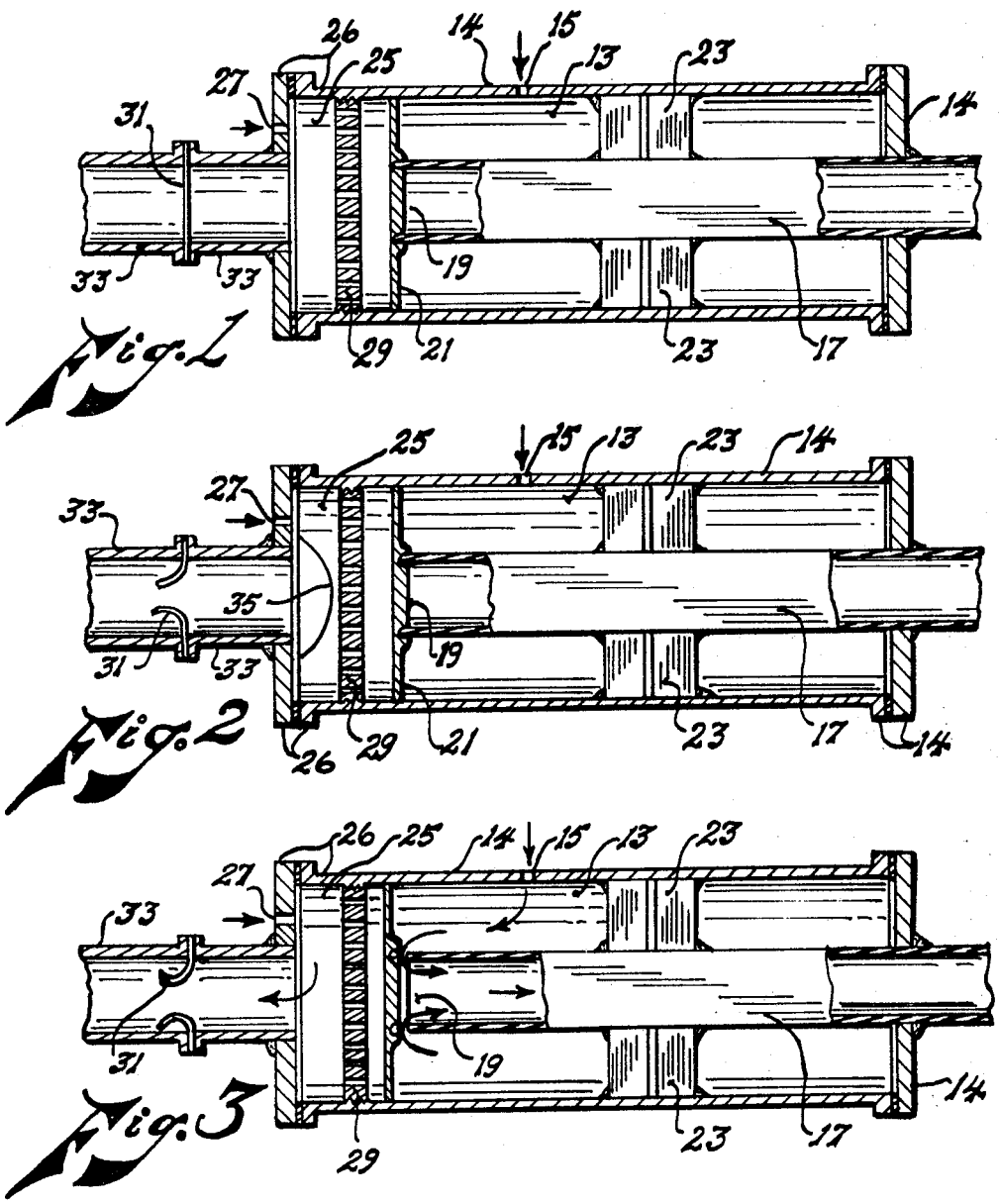

FAST OPENING PLATE VALVE SHOCK TUBE SYSTEM

BACKGROUND OF THE INVENTION

This invention relates to a fast opening plate valve for use with a shock tube in the creation of high pressure shock curves and, more particularly, the invention is concerned with providing a plate valve which operates on the principle of suddenly reducing the pressure on one side thereof, creating a high pressure difference causing the valve to move quickly to the open position.

Heretofore, shock waves were created in tubes by covering one end with a frangible diaphragm and then rupturing the diaphragm to allow gas under pressure to enter the tube and create the shock wave. Generally, the diaphragm ruptures with explosive force because of the high pressure differentials involved and parts of the diaphragm are carried downstream in the shock tube. This situation creates a dangerous condition and interferes with tests being carried out in the shock tube. Also, it becomes necessary to replace the frangible diaphragm each time a shock wave is created in the tube.

In order to overcome these problems, a plate valve with a very fast opening characteristic is required so that the shock wave can be properly formed in the shock tube. At the same time, it would be especially advantageous to utilize a pressure release system wherein the valve diaphragm covering the shock tube is not destroyed with each operation so that no pieces of ruptured valve diaphragm can enter the orifice in which the shock wave is formed and produce the resultant problems of missile-type particles in the shock tube.

SUMMARY OF THE INVENTION

The present invention provides a shock tube system having a very fast opening plate valve which includes a thin aluminum plate covering the upstream end of a shock tube adapted to serve as a shock wave conduit. In the closed position, high pressure is applied to both sides of the plate. When the pressure on one side of the plate is suddenly reduced, a high pressure difference occurs causing the plate to accelerate greatly in the direction of the low pressure thereby uncovering the upstream end of the shock tube and allowing the high pressure gas to enter the orifice. Thus, a shock wave is created in the tube without the use of a frangible diaphragm in the region of the shock tube orifice.

Accordingly, it is an object of the present invention to provide a shock tube system having a fast opening plate valve suitable for use with a shock tube to control the covering and uncovering of the orifice during the creation of a shock wave in the tube.

Another object of the invention is to provide a fast opening plate valve which operates on the principle tat, when high pressure is applied to both sides of a thin metal plate and one side is suddenly reduced, a high pressure difference occurs across the plate causing it to accelerate greatly in the direction of the reduced pressure.

Still another object of the invention is to provide a fast acting plate valve for use over the orifice of a shock tube such that the portion of the plate that covers the orifice cannot contribute to the opening force, thereby reducing the opening time an amount corresponding to the relative surface covering the orifice to that of the entire plate.

A further object of the invention is to provide a fast opening plate valve to control the uncovering of the orifice of a shock tube wherein the rupture of a pressure release diaphragm causes a low pressure rarefaction which passes into the high pressure region and reflects on one side of movable plate creating a high pressure difference across the rim of the plate forcing the plate away from its sealing seat.

A still further object of the invention is to provide a means for controlling the entrance of high pressure gas into a shock tube including a pressure release diaphragm separating high and low pressure areas, a perforated plate in the high pressure area and a free movable plate arranged to move toward the perforated plate when the release diaphragm is ruptured to allow high pressure gas to enter the orifice of the shock tube. These and other objects, features, and advantages will become more apparent after considering the description that follows taken in conjunction with the attached drawings wherein like reference characters are used throughout to identify like elements.

DESCRIPTION OF THE DRAWINGS

FIG. 1 is a view in partial cross section of a fast opening plate valve according to the invention in the closed preinitiation stage;

FIG. 2 is a view of the plate valve showing the first stage of pressure release following rupture of the release diaphragm; and FIG. 3 is a view of the plate valve as it begins to open rapidly because of the great pressure differential and allows the high pressure gas to enter the orifice of the shock tube.

DESCRIPTION OF A PREFERRED EMBODIMENT

Referring now to the drawings, the very fast opening plate valve for controlling the operation of a shock tube according to the invention includes a first pressurized chamber 13 having a wall portion 14 and an inlet 15 through which the pressurized gas is allowed to enter. A shock tube 17 forms an orifice and is positioned in the first pressurized chamber 13 and includes an intake end 19 for receiving the pressurized gases which form the shock wave in the shock tube 17. The intake end 19 of the shock tube 17 is covered with a movable plate 21 for controlling the flow of gases passing into the orifice and completing the enclosure of chamber 13. A plurality of support fins 23 serve to maintain the shock tube 17 in concentric relationship with the pressurized chamber 13.

A second pressurized chamber 25 having a wall 26 is located forward of said movable plate 21 which forms one end of the second chamber and includes an inlet 27 through which the pressurized gases pass. Located within the chamber 25 is a perforated plate 29 fixedly attached to the wall 26 of the second chamber 25. The perforated plate 29 acts as a stop for the movable plate 21 when the latter moves away from its position over the intake end 19 of the orifice. A frangible diaphragm 31 is positioned in a tubular portion 33 of the second pressurized chamber 25 and forms one wall thereof.

In FIG. 1, the plate valve is shown closed in its static state. The movable plate 21 is pressed against the intake end 19 of the shock tube 17 thereby preventing the passage of gas under pressure in the first pressurized chamber 13 from entering the shock tube 17. Thus, passage between the high and low pressure regions is sealed.

In FIG. 2, the first stage of the pressure release process is shown. The frangible diaphragm 31 has been ruptured and a low pressure rarefaction 35 is shown passing into the second pressurized chamber 25 toward the movable plate 21.

In FIG. 3, the low pressure rarefaction reflects on one side of the movable plate 21 creating a high pressure difference in the area of the rim of the plate 21 causing it to move away from its sealing seat on the intake end 19 of the shock tube 17. The high pressure gas in the first pressurized chamber 13 is then allowed to enter the low pressure region in the shock tube 17 and create the shock wave.

MODE OF OPERATION

In operation, a high pressure gas source (not shown) is applied to inlets 15 and 27 of chambers 13 and 25, respectively, such that the movable plate 21 is pressed against the end of the shock tube 19 sealing the passage between the high pressure regions and the low pressure region within the tube. Upon reaching a pressure where diaphragm 31 is ruptured, a low pressure rarefaction passes into the high pressure region of chamber 25 toward the movable valve plate 21. A high pressure difference across the rim of plate 21 forces it away from its sealing seat on the end of shock tube 19 and releases the high pressure gas in chamber 13 into the low pressure region within the shock tube.

It has been found that a ⅝-inch thick aluminum plate with 550 p.s.i. force will accelerate at approximately 250,000 ft/sec/sec which will move the plate 3 inches in one-half millisecond. Perforated plate 29 forms a stop for the plate valve 21.

In general, the movable plate should move approximately half of the radius of the inside tube for the opening equals the inside cross section area.

The equation $$t = \sqrt{\frac{r\tau A_T D_m}{A_0 P}}$$

gives the approximate time for the valve to open completely to a distance ½r (inside tube radius) where $\tau$ is the thickness of the movable plate having density $D_m$ and total cross section area $A_T$. The initial over pressure to be released is P which is applied across the rim of the plate, the area of which is $A_o \approx A_T - \pi r^2$.

An example of a sample set of values for the system would be
r=0.29 feet
$\tau$=0.021 feet
$A_T$=1.75 sq. feet
$A_o$=1.475 sq. feet
$D_m$=5.5 slugs/cu.ft. (aluminum)
P=144,000 lb./sq. ft. maximum operating pressure of one system according to its design
then
t=525 microseconds Thus, there has been disclosed a shock tube system having a very fast opening plate valve which allows for the production of a shock wave within a tube without the disadvantages of previously utilized systems.

I claim:
1. A shock tube system comprising:
    an enclosure,
    a shock tube extending within said enclosure at one end thereof,
    a plate movable within and dividing said enclosure into two chambers and adapted to seal the end of said shock tube opening into one of said chambers within said enclosure,
    a high pressure gas inlet for each of said chambers, and
    a rupturable diaphragm responsive to a pressure differential for releasing the pressure in the other one of said chambers remote from shock tube to release pressure in said other chamber,
    thereby causing a rarefaction which produces a pressure difference across the outer periphery of said plate to cause it to accelerate rapidly away from said shock tube to allow gas under high pressure to enter said shock tube.